United States Patent [19]

Cushner et al.

[11] 3,636,535

[45] Jan. 18, 1972

[54] MAGNETO-OPTICAL TRANSDUCER

[72] Inventors: Stanton H. Cushner, Los Angeles; Patrick E. Ferguson; Henry W. Griffiths, both of Torrance; Alfred M. Nelson, Redondo Beach, all of Calif.

[73] Assignee: The Magnavox Company, Torrance, Calif.

[22] Filed: Dec. 10, 1969

[21] Appl. No.: 880,490

Related U.S. Application Data

[63] Continuation of Ser. No. 539,386, Apr. 1, 1966, abandoned.

[52] U.S. Cl.........................................340/174.1 M, 350/151

[51] Int. Cl.........................................G11c 13/04

[58] Field of Search........................................340/174.1 M

[56] References Cited

UNITED STATES PATENTS

| | | | |
|---|---|---|---|
| 3,174,140 | 3/1965 | Hagopian | 340/174.1 |
| 3,196,206 | 7/1965 | Griffiths | 340/174.1 |
| 3,224,333 | 12/1965 | Kolk | 340/174.1 |
| 3,229,273 | 1/1966 | Baaba | 340/174.1 |
| 3,472,575 | 10/1969 | Hunt | 340/174.1 |
| 3,474,431 | 10/1969 | Griffiths | 340/174.1 |

*Primary Examiner*—Terrell W. Fears
*Attorney*—Smyth, Roston & Pavitt

[57] ABSTRACT

This invention relates to a magneto-optical transducer having a thin magnetic film of a critical thickness dependent upon the characteristics of the magnetic materials comprising the film. When the film is provided with the critical thickness, the rotation of polarized light directed to the film is enhanced to an optimum value. This rotation is produced in accordance with the magnetic states provided in the thin film. The ellipticity of the rotated light is also minimized by providing the thin film with a critical thickness.

The thin film is supported by a substrate which preferably comprises an optical prism. A thin layer of a dielectric layer is preferably disposed on the thin magnetic film to enhance the reflectivity of the transducer to the portion of the polarized light passing through the thin magnetic film. This enhanced reflectivity is desirable since the provision of the thin magnetic film with a critical thickness tends to reduce the ability of the thin magnetic film to reflect the polarized light directed to the film.

21 Claims, 6 Drawing Figures

INVENTORS:
STANTON H. CUSHNER
PATRICK E. FERGUSON
HENRY W. GRIFFITHS
ALFRED M. NELSON

By Smyth, Roston & Pavitt
ATTORNEYS

INVENTORS:
STANTON H. CUSHNER
PATRICK E. FERGUSON
HENRY W. GRIFFITHS
ALFRED M. NELSON

By Smyth, Roston & Pavitt,
ATTORNEYS

INVENTORS:
STANTON H. CUSHNER
PATRICK E. FERGUSON
HENRY W. GRIFFITHS
ALFRED M. NELSON

By Smyth, Roston & Pavitt
ATTORNEYS

MAGNETO-OPTICAL TRANSDUCER

This is a continuation of application Ser. No. 539,386 (now abandoned) filed Apr. 1, 1966, and entitled "Magneto-optical Transducer."

This invention relates to a transducer. Specifically, this invention relates to a transducer for reproducing information recorded on a magnetic medium such as a magnetic tape. The transducer of the present invention provides for a nonmagnetic representation of the information recorded on the magnetic medium by producing an optical effect in accordance with the magnetic information.

Specifically, the transducer of the present invention uses the Kerr magneto-optical effect to produce an optical representation of the magnetic information recorded on the magnetic medium such as magnetic tape. The Kerr magneto-optical effect produces a rotation in the major plane of polarization of light energy which is directed towards a magnetic medium upon the reflection of the light energy from the magnetic medium. The rotation in the major plane of polarization of the light energy is in accordance with the magnetization of the magnetic medium.

The use of a magneto-optical transducer for reading information recorded on a magnetic medium such as magnetic tape is desirable over the use of ordinary magnetic reproducing heads for essentially two reasons. First, a reproducing system incorporating a magneto-optical readout produces less wear on the magnetic medium and the reproducing transducer in comparison to the use of conventional magnetic heads. The lower wear results from the particular nature of the magneto-optical transducer which does not require a physical contact between the magnetic medium such as magnetic tape and the magneto-optical transducer as with conventional magnetic reproducing heads. Second, the use of a magneto-optical transducer can provide for a higher density reproduction of information in comparison with conventional magnetic reproducing heads, therefore providing for a higher resolution in magnetic recording-reproducing systems. Present magnetic recording-reproducing systems are limited in the reproducing of the information since conventional magnetic heads cannot reproduce with a resolution equal to that achieved with present recording heads.

An ideal magneto-optical reproducing system would direct light toward the magnetic medium such as magnetic tape with a corresponding reflection of the light from the surface of the magnetic medium. The light energy reflected from the magnetic medium such as magnetic tape would therefore be rotated in accordance with the Kerr magneto-optical effect to produce a nonmagnetic representation of the information present on the magnetic medium. The information recorded on the magnetic medium would be reproduced by measuring the rotation of the light energy.

The use of a reproducing system which directs light towards the surface of the magnetic medium such as magnetic tape is impractical since the average magnetic medium does not include a specular surface so as to provide for an accurate reflection of the light energy. The provision of a magnetic medium such as magnetic tape with a specular surface at the present time would be impractical since the cost would be prohibitive. In order to overcome the above difficulty while still reproducing the information on the magnetic medium using the Kerr magneto-optical effect, a magneto-optical transducer is used to provide for an indirect reading of the information on the magnetic medium.

The magneto-optical transducer usually includes a substrate such as glass which has a thin film of magnetic material disposed on one surface of the substrate. The thin film is placed adjacent to the magnetic medium such as magnetic tape. Light energy is directed through the substrate to the back face of the thin film and is reflected from the back face of the thin film. The magnetic information present in the magnetic medium such as magnetic tape induces corresponding magnetic states in the thin film. In order to have a proper induction of the magnetic information from the magnetic medium such as magnetic tape to the thin film, it is desirable to have the coercivity of the thin film significantly lower than the coercivity of the magnetic medium. The thin film may have either low or high remanence depending upon whether the reading of the magnetic information using the magneto-optical effect is instantaneous or whether the reading occurs at some later time. The normal situation provides for an instantaneous reading of the information in the magnetic medium such as magnetic tape while using the magneto-optical effect for rotating the light reflected from the thin film as the magnetic medium is moved relative to the thin film.

The use of a magneto-optical transducer, as described above, provides for an excellent specular surface in the thin film so as to provide for the optical qualities required in a magneto-optical transducing system. Since the substrate and the thin film can both be accurately controlled and since it is only necessary to provide one such magneto-optical transducer in each reproducing system, the cost of providing excellent optical quality in the magneto-optical transducer is small relative to the overall cost of the system. The prior art magneto-optical transducers using the indirect magneto-optical effect therefore provided the excellent optical qualities necessary for the use of the Kerr magneto-optical effect in a reproducing system.

One difficulty with the prior art magneto-optical transducers is that the output light energy produced from the reflected rotated light energy has a relatively low amplitude and low contrast. The amplitude of the output light energy is dependent on the rotation of the reflected light energy and the higher the rotation the larger the amplitude of the output light energy. While the amplitude of the output light energy is dependent on the rotation, the contrast is dependent on the ellipticity in the reflected light energy. The smaller the ellipticity in the reflected light energy the greater the contrast. In order to provide for the best possible output light energy from a reproducing system using the magneto-optical effect, it is therefore desirable to increase the rotation and/or to decrease the ellipticity of the reflected light. It is also desirable to increase the magnitude of the reflected light so that as little of the light energy as possible is lost.

Prior art magneto-optical transducers have attempted to increase the rotation and magnitude of the reflected light in various ways. First, the use of particular dielectric materials associated with the thin film increases the magnitude of the reflected light. The prior art magneto-optical transducers also used thinner magnetic films in the range of 500 to 1,000 angstroms which increase the rotation of the reflected light energy. Also the use of a prismatic substrate enhanced the rotation of the reflected light due to the magneto-optical effect over the use of a paralleled faced flat or rounded glass substrate. Finally, the use of very thin magnetic films smaller than 500 angstroms enhanced the effect of the rotation of the reflected light energy due to the magneto-optical effect.

The present invention uses a thin magnetic film disposed on one surface of a substrate such as an optical prism. The present invention, however, has the thin magnetic film deposited on the substrate of a critical thickness so as to produce a maximum rotation of the reflected light and a minimum ellipticity. The particular thickness of the thin film deposited on the substrate such as an optical prism to produce the maximum rotation and minimum ellipticity is dependent on the specific magnetic material used. Some materials give higher rotations of the reflected light due to the magneto-optical effect than others. Some materials give lower ellipticities in the reflected light than others at their maximum rotational critical thickness. It is therefore possible to tailor the structure of the magneto-optical transducer constructed in accordance with the present invention so as to provide for varying characteristics.

For example, if it is desirable that the output light energy has a maximum contrast, a particular magnetic material is chosen which produces a very low ellipticity in the reflected light, and the amplitude of the rotation of the reflected light due to the use of the particular material, is given a lesser importance. On the other hand, it may be desirable to have a large amplitude for the output light energy, and a magnetic material is chosen which provides for a high rotation of the reflected light neglecting the ellipticity of the reflected light due to the use of this particular magnetic material. For normal situations, it would be desirable to use a magnetic material which provides reflected light which has a relatively high rotation and a relatively low ellipticity. This provides for a sufficient amplitude and a relatively high contrast in the output light energy.

The present invention therefore provides a magneto-optical transducer for producing output light energy which has a higher amplitude and a higher contrast than could be achieved with previous magneto-optical transducers. The particular structure of the magneto-optical transducer of the present invention and other aspects of the present invention will become clearer with reference to the drawings, wherein.

Figure 1:
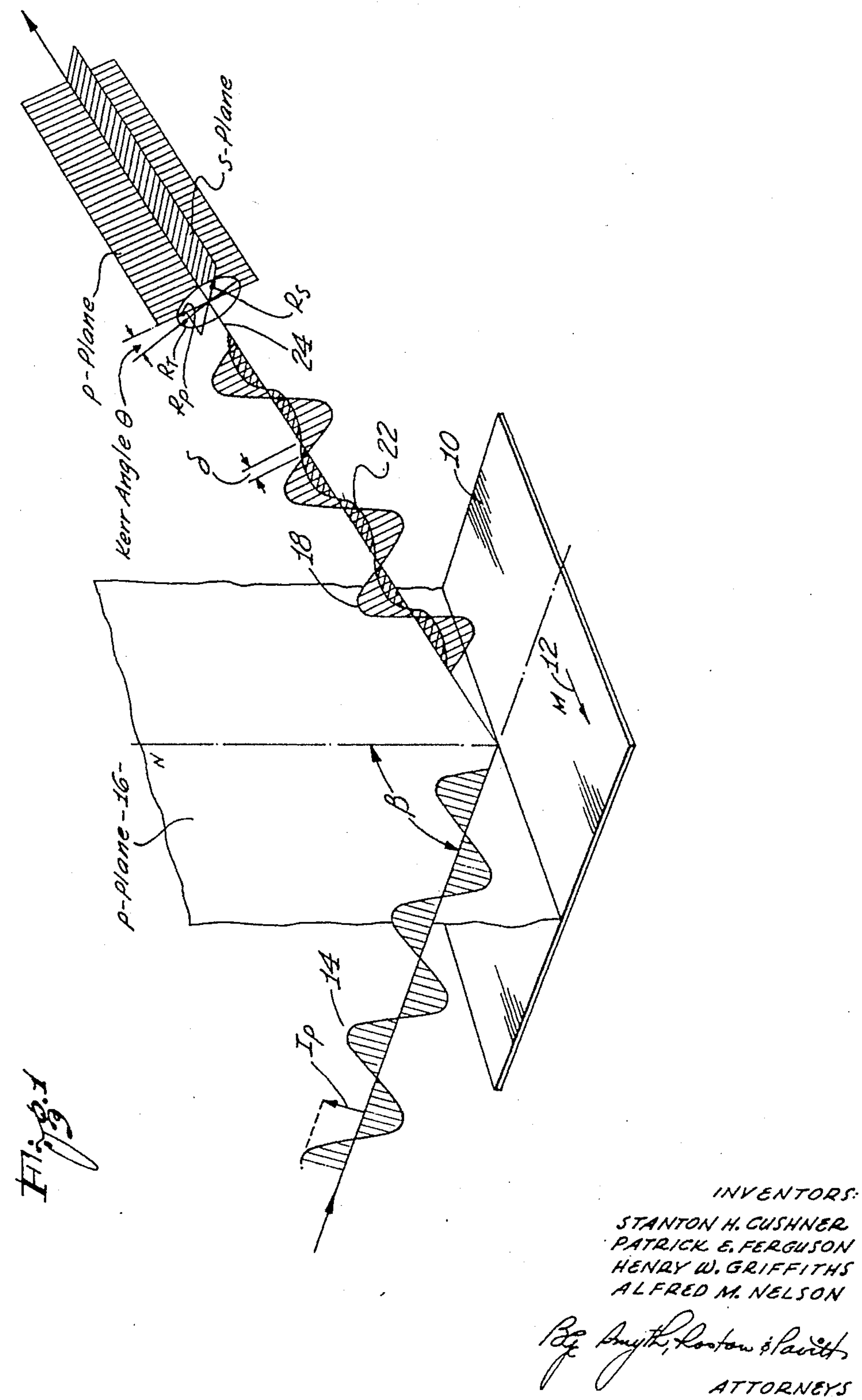
FIG. 1 is an illustration of a physical model showing the effect of the reflection of light energy from a magnetic surface and in particular the rotation and ellipticity of the reflected light energy.

FIG. 1 is an illustration of a model showing the reflection of light energy from a magnetic surface and particularly the rotation of the reflected light energy due to the Kerr magneto-optical effect. Since the Kerr magneto-optical effect operates to rotate light in its major plane of polarization, a maximum rotation and measurement of that rotation occurs with a linearly polarized beam of light energy having its plane of polarization normal to the surface of the magnetic material.

In FIG. 1, a magnetic material 10 is magnetized in the direction shown by the arrow 12. A beam of linearly polarized light energy 14 is shown directed towards the surface of the magnetic medium 10. For purposes of illustration the magnetic vector of the light energy 14 is disregarded and only the electric vector is shown constituting the beam of light 14. The electric vector in the plane of polarization is represented by the arrow ($I_p$). The plane of polarization of the light energy 14 is normal to the surface of the magnetic medium 10. The plane of polarization is represented by the *p*-plane 16. The angle of incidence is shown by the angle ($\beta$).

As the light energy strikes the surface of the magnetic medium 10, a portion of the light energy is reflected in the plane of polarization 16. The reflected light energy is shown at 18 and is represented by the electric vector ($R_p$) which is shown at the extension of the *p*-plane 20. In addition to the reflected wave 18 in the *p*-plane, represented by the electric vector ($R_p$), a rotated wave 22, represented by the electric vector ($R_s$), is produced in accordance with the magnetic states in the magnetic material 10 and ($R_s$) is in a plane 24 called the *s*-plane which is normal to the *p*-plane. ($R_p$) and ($R_s$) represent the two components of the total reflected wave represented by the electric vector ($R_t$) which is rotated through a particular angle $\theta$ dependent upon the magnitude of ($R_p$) and ($R_s$). In addition, the two component light waves 18 and 20 represented by the electric vectors $R_p$ and $R_s$ are out of phase by a phase angle $\delta$ which produces ellipticity in the total reflected light energy. The total reflected light energy represented by the electric vector ($R_t$) is therefore an elliptically polarized wave rotated from the incidence plane of polarization.

Figure 2:
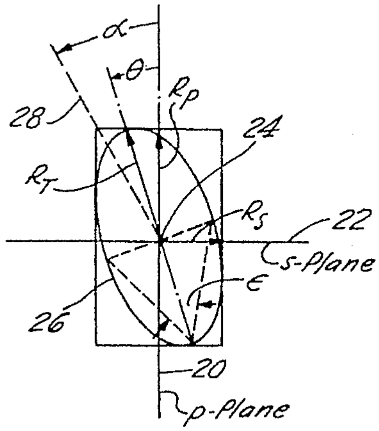
FIG. 2 illustrates an end view of the reflected light energy of FIG. 1.

FIG. 2 illustrates an end view of the reflected, rotated wave as represented by the electric vector ($R_t$) as shown in FIG. 1, and similar elements to those of FIG. 1 are given the same reference characters. In FIG. 2, the two components of the total reflected light energy ($R_p$) and ($R_s$) are 90° to each other. ($R_p$) is in the *p*-plane 20 and ($R_s$) is in the *s*-plane 22. The direction of propagation of the reflected light energy is into the paper along an axis shown by the point 24 in FIG. 2 and the line 24 in FIG. 1. The phase angle $\delta$ is along the axis represented by the line 24. The resultant configuration of the total reflected light energy represented by the electric vector ($R_t$) is an ellipse as defined by the ellipse 26 which is the locus of points representing the summation of the instantaneous ($R_p$) and ($R_s$) vectors. The major plane of polarization of the elliptically polarized light energy represented by the electric vector ($R_t$ ) is rotated through an angle $\theta$ from the *p*-plane. The angle $\theta$ is therefore referred to as the "Kerr angle." The ellipticity of the elliptically polarized light energy is fined by the angle $\epsilon$ shown in FIG. 2.

It can be seen from FIGS. 1 and 2 that if the light waves 18 and 22 are in phase, then the resultant light energy would be rotated through an angle $\alpha$ and be linearly polarized along the line 28. As the ellipticity in the reflected light energy is reduced, the angle of rotation increases since ellipticity and rotation are interdependent. The reduction or elimination of the ellipticity would directly increase the contrast of the resultant output signal, as will be explained with reference to FIG. 3.

Figures 3, 6:
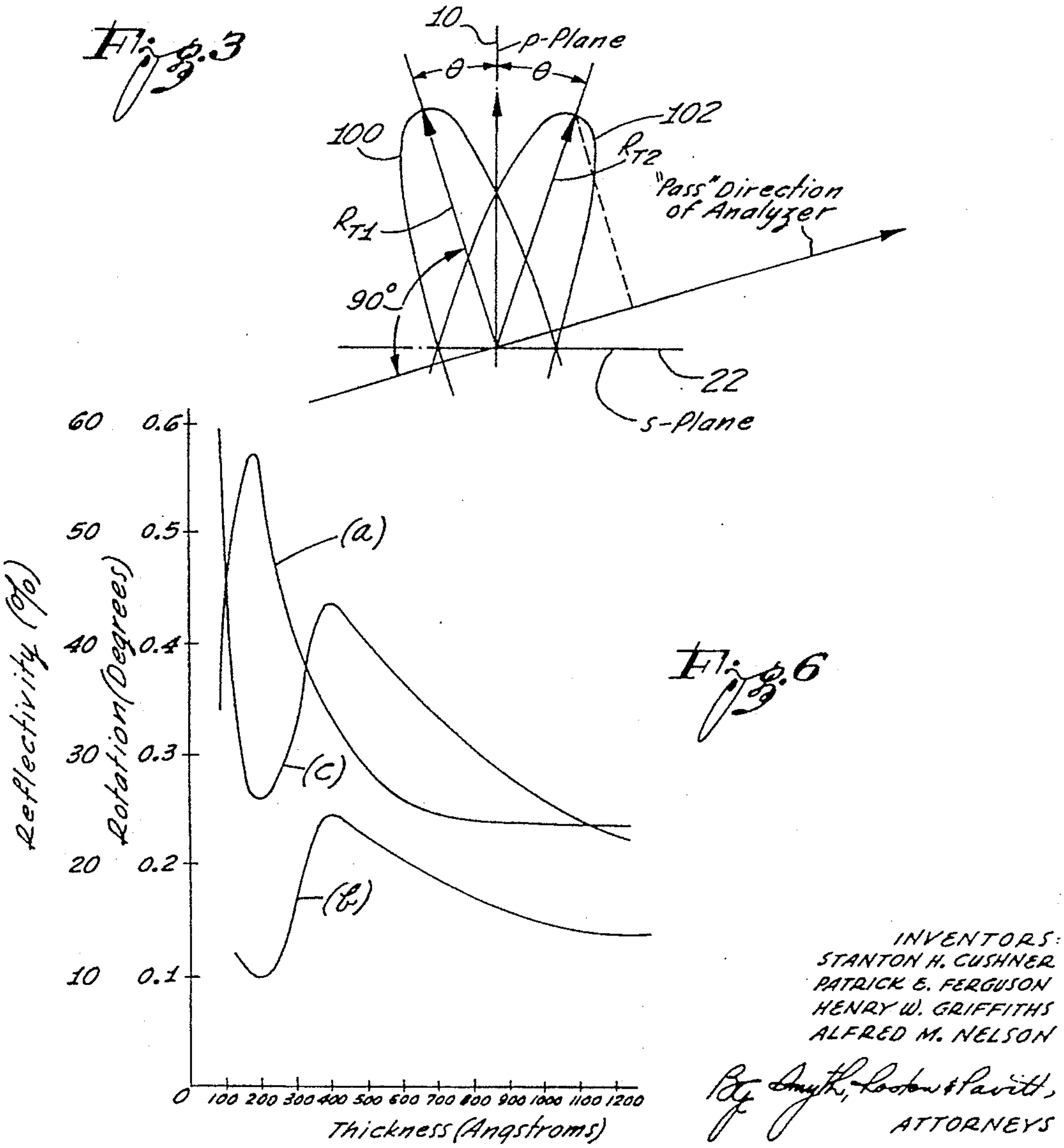
FIG. 3 illustrates an end view of the reflected light energy such as in FIG. 1 wherein the magnetic surface has been magnetized in two opposite direction.
FIG. 6 is a series of curves illustrating the rotation, the ellipticity and reflectivity versus thickness of the thin film.

In FIG. 3, a portion of two elliptically polarized waves are shown which are produced by magnetizing the magnetic material 10 in two opposite directions. In FIG. 1, magnetization of the magnetic material 10 in the direction shown by the arrow 12 rotates the reflected light energy in a counterclockwise direction through an angle $\theta$ as shown in FIG. 2. A similar rotation of the reflected light energy is shown in FIG. 3 where reflected light energy is rotated in a counterclockwise direction through an angle $\theta$ to produce an elliptically polarized wave 100 which is represented as having an electric vector ($R_{t2}$) along its major plane of polarization. In addition, again with reference to FIG. 1, the magnetization of the magnetic material 10 in a direction opposite to that illustrated by the arrow 12 would produce a clockwise rotation of the reflected light energy. A similar rotation of the reflected light energy is shown in FIG. 3 where reflected light energy is rotated in a clockwise direction through an angle $\theta$ to produce an elliptically polarized wave 102 which is represented as having an electric vector ($R_{t2}$) along its major plane of polarization.

The total rotation between the elliptically polarized waves 100 and 102 is $2\theta$. In order to use this rotation of the reflected light energy to produce an output light signal it is necessary to place an analyzer in the path of the reflected light energy. The analyzer is a polarizer which passes light in a particular direction of polarization. If, for example, the analyzer was disposed to pass light in the *p*-plane 20, the resultant light output signals would be equally bright for both directions of rotation. If, however, the analyzer was disposed to pass light in the *s*-plane 22, the output light signals would again be equally bright for both directions of rotation. Of course, the amplitude of the light output signals determines the brightness so the light output signals would be much brighter when the analyzer is placed to pass light in the *p*-plane 20 than when the analyzer is placed to pass light in the *s*-plane 22.

The placement of the analyzer in either of the two positions indicated above would not be helpful because there would be no difference between the amplitude of the light output signals for the opposite directions of rotation. Placing the analyzer in any position to pass light in any plane other than the *p*-plane 20 or the *s*-plane 22 produces a difference in the brightness from the light output signals for the opposite directions of rotation. The maximum contrast between the light output signals for the opposite directions of rotation is achieved when the analyzer is disposed to pass light 90° from the plane represented by either the ($R_{t1}$) or the ($R_{t2}$) electric vectors. The pass direction for the analyzer to produce maximum contrast is therefore normal to the major axis of either of the elliptically polarized light waves reflected from the magnetic material magnetized to the two opposite directions.

It can be seen with reference to FIG. 3 that an increase in the rotation angle ($\theta$) of the reflected light energy would produce an increase in the amplitude of the light passed by the analyzer when the analyzer is in the normal position to produce maximum contrast. In addition, again with reference to FIG. 3, a decrease in the ellipticity of the reflected light waves would produce an increase in the contrast between the output light signals produced from the polarized light waves reflected from the magnetic material magnetized in the two opposite directions. It can therefore be seen from FIGS. 1 through 3 that it would be desirable to increase the angle of rotation and to decrease the ellipticity of the reflected light energy so as to produce the maximum amplitude output light signal from the analyzer and in addition to enhance the contrast between the output light signals from the analyzer.

Figures 4, 5:
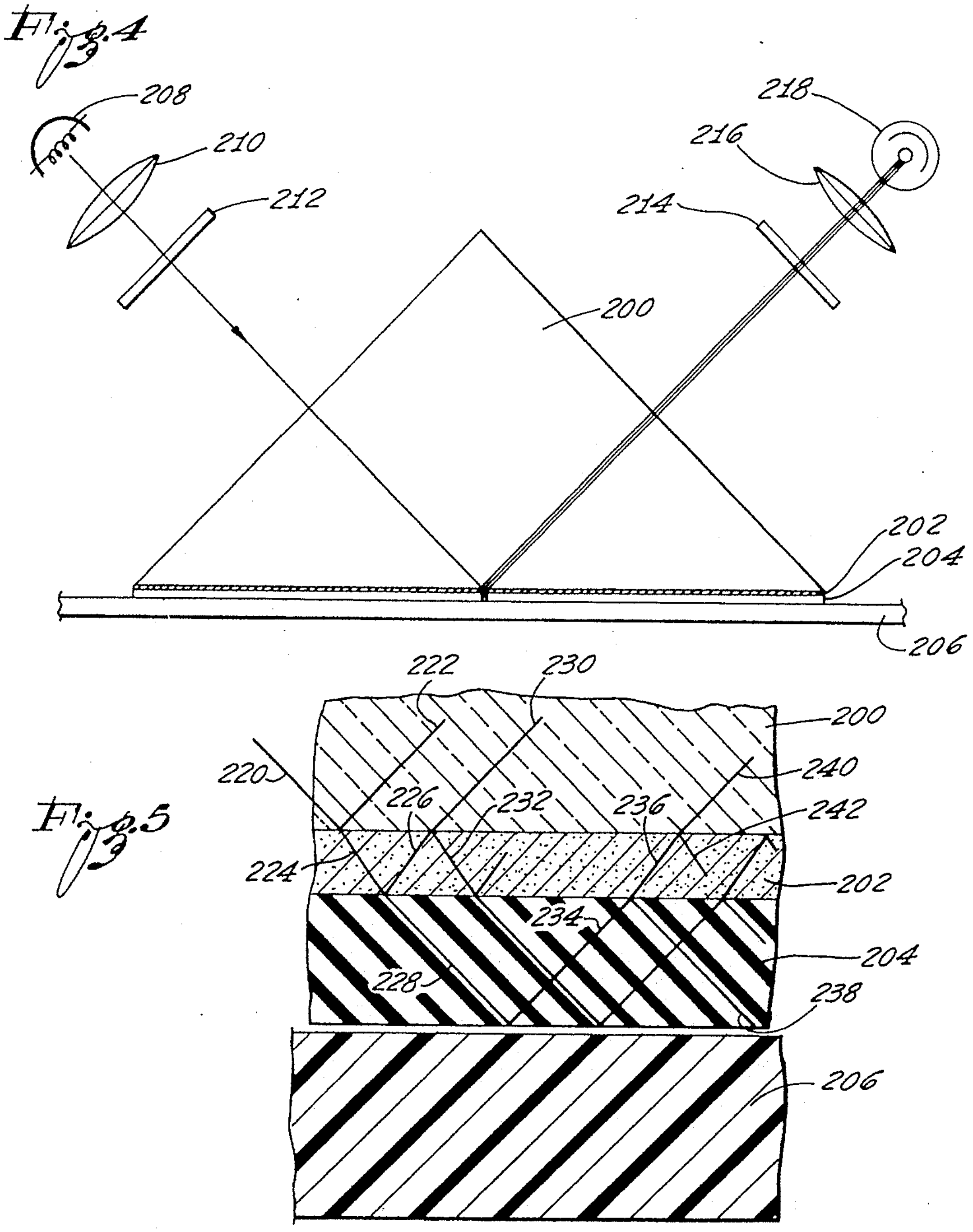
FIG. 4 is a magneto-optical transducer constructed in accordance with the present invention.
FIG. 5 is a detailed exploded view of the magneto-optical transducer of FIG. 4 and specifically illustrating the multiple reflections in the magneto-optical transducer.

In FIG. 4 a magneto-optical transducer constructed in accordance with the present invention is shown. The transducer of FIG. 4 produces reflective light energy having a maximum angle of rotation ($\theta$) with a minimum ellipticity for a particular material. The magneto-optical transducer of FIG. 4 includes a 45°–45°–90° optical prism 200 although prisms having other angular relationships may be used. The prism 200 is designed to produce total internal reflection. A thin film of magnetic material 202 is disposed on one surface of the optical prism 200. A protective coating 204 of dielectric material of a given thickness covers the thin film 202 to both protect the thin film and to increase the magnitude of the reflected light. The thickness of the dielectric material 204 may be adjusted to a critical point so as to produce a maximum reflection of the light energy. A magnetic medium 206 such as a magnetic tape is disposed adjacent to the thin film 202 and dielectric coating 204. The information recorded on the magnetic medium 206 induces corresponding magnetic states in the thin film 202.

A source of light energy 208 such as an incandescent lamp directs light to a lens system 210. The lens system 210 produces a collimated beam of light which passes through a polarizer 212. The polarizer 212 is adjusted to linearly polarize the light energy to produce a light wave 14 as shown in FIG. 1. The light energy from the polarizer 212 passes into the prism 200 and strikes the back surface of the thin film 202. As will be explained later in more detail, one possible explanation of the behavior of the magneto-optical transducer of the present invention is that the light energy experiences multiple reflections before passing out of the prism 200 and through an analyzer 214. The analyzer 214 is adjusted to operate in a manner discussed above with reference to FIG. 3.

The light energy passed by the analyzer 214 is focused by a lens system 216 and is directed to a photodetector 218. Since it is desirable to increase the rotation and reduce the ellipticity of the light energy directed to the analyzer 214, as explained above with reference to FIGS. 1 through 3, the magneto-optical transducer of the present invention has the thin film 202 of a critical thickness so as to enhance the rotation and to reduce the ellipticity of the light passing from the prism 200.

FIG. 5 illustrates a detailed view of the portion of the magneto-optical transducer of FIG. 4 wherein the light energy is directed to the back surface of the thin film 202. Light energy 220 initially passes through the prism 200 to strike the back surface of the thin film 202. A portion of the light energy 220 is directly reflected from the back surface of the thin film 202 as shown by line 222. The light energy 222 experiences a rotation as explained above with reference to FIGS. 1 through 3. In addition, a portion of the light energy 220 as represented by the line 224 enters into the thin film 202.

If the thickness of the thin film 202 were large, the light energy 224 which entered into the thin film 202 would be absorbed. If, on the other hand, the thickness of the thin film 202 were very small, then there would not be sufficient magnetic material to produce a rotation of the light energy 220. There is, however, a critical thickness for the thin film 202 whereby the transmissivity of the thin film 202 is sufficiently great so that light energy can pass within the thin film and the dielectric material 204 and experience multiple reflections and where there is sufficient magnetic material to produce rotation of the light energy.

The multiple reflections are shown with reference to FIG. 5 where a portion of the light energy 224 is reflected from the front surface of the thin film to produce light energy represented by the line 226 and where a portion of the light energy 224 enters into the dielectric material 204 as represented by the line 228. When the light energy 224 is reflected to produce light energy 226, light energy 226 includes an additional rotational component. The additional rotational component occurs since the Kerr magneto-optical effect produces a rotation upon the reflection of light energy from a surface in the presence of a magnetic field. When the light energy 226 reaches the back surface of the thin film 202, a portion of the light energy represented by the line 230 leaves the thin film 202 and enters the prism 200. The light energy 230 therefore adds with the light energy 222. In addition to the above a portion of the light energy 226 is reflected back into the thin film 202 as represented by the line 232. The light energy 232 has an additional rotational component in accordance with the Kerr magneto-optical effect.

The light energy 228 passes through the dielectric material 204 and the refractive indexes of the various materials of the magneto-optical transducer are chosen so that a total internal reflection takes place in the dielectric material 204. Actually, the reflection takes place at the interface between the dielectric material 204 and the air space between the dielectric material 204 and the magnetic tape 206. It is desirable that the magnetic tape 206 not be forced into optical contact with the dielectric material as this would destroy the total internal reflection. The use of the dielectric material 204 increases the magnitude of the reflected light and a critical thickness for the dielectric material is chosen to maximize the reflected light. The light energy 228 is reflected to produce light energy 234. The light energy 234 is split into two portions 236 and 238. Light energy 236 in turn is split into two portions 240 and 242. Light energy 240 adds with light energy 222 and 230 as part of the total reflected light energy from the prism 200. It is to be appreciated that the dimensions of FIG. 5 are greatly exaggerated and that the light energy 222, 230 and 240 are very close together. It is also to be appreciated that a great number of multiple reflections are produced within the thin film 202 and the dielectric material 204 and that the number of multiple reflections shown in FIG. 5 are for purposes of illustration.

Another method of describing the operation of the magneto-optical transducer of the present invention is to say that for a particular thickness of the thin film and the dielectric material, the dimensions are such that a resonant condition is set up into the thin film so that the light energy bounces back and forth within the thin film and the dielectric material. A further explanation is that the light energy from the prism 200 is composed of many components, all of which are out of phase. It is therefore possible that the rotated components of the total light energy interact so that they are more nearly in phase with the normal reflected components of the total light energy. This would essentially produce the condition illustrated with reference to FIG. 1 wherein the angle $\delta$ is reduced. The reduction of the angle $\delta$ would increase the angle of rotation, as explained above with reference to FIG. 2 and in addition would reduce the ellipticity to enhance the contrast as explained above with reference to FIG. 3.

Notwithstanding the particular manner in which the magneto-optical transducer of the present invention works, the resultant light energy from the prism 200 using the critical thickness for the thin film 202 is enhanced both as to an increase in the amplitude of rotation and a decrease in the ellipticity.

The particular critical thickness for the thin film 202 depends on the particular material used. FIG. 6 is a series of curves showing the results that may be obtained using a prism with a thin film. The particular curves are directed to a material composed of 50 percent cobalt and 50 percent iron but it is to be appreciated that tests on other magnetic materials would produce similar results. For example, materials such as pure iron, alloys of germanium-iron, iron-cobalt and combinations of iron with magnesium fluoride may all be used for the thin film 202.

In FIG. 6 the curve (a) illustrates the rotation of the light energy along the major axis of polarization in accordance with the thickness of the thin film. Prior art transducers used relatively thick films and had relatively low angles of rotation. Even the prior art transducers which used relatively thin films to enhance or magnify the rotation of the light energy did not appreciate that a particular thickness for the thin film would produce a maximum rotation of the light and/or a minimum ellipticity of the light. For the particular curve (a) the maximum rotation of the light occurs at approximately 175 angstroms.

Curve (b) illustrates the ellipticity of the rotated light energy versus the thickness of the thin film. The ellipticity is defined by the angle $\epsilon$ explained with reference to FIG. 2. It can be seen that the ellipticity of the rotated light energy is at a minimum at approximately the same thickness for the thin film when the rotation is at a maximum. The reduction of the ellipticity enhances the contrast between the output light signals produced using a magneto-optical transducer of the present invention.

Curve (c) illustrates the reflectivity in percentage versus the thickness of the thin film. As the thickness of the thin film decreases, the reflectivity increases until it reaches a maximum. Further reductions in the thickness of the thin film result in decreases in the reflectivity of the thin film. Although the reduction of the reflectivity may be thought of as a disadvantage since more light energy is now entering into the thin film 202 as shown in FIGS. 4 and 5, the use of the dielectric material 204 enhances the overall reflectivity. For example, the use of the dielectric material may increase the reflectivity so that over 80 percent of the light is recovered without any substantial change in the rotation or ellipticity.

It can be seen, therefore, that the use of the critical thickness for the thin film 202 produces enhanced magneto-optical effects. The present invention, therefore, is directed to a magneto-optical transducer using a thin film having a critical thickness to increase the rotation and to decrease the ellipticity of the resultant rotated light energy. The particular enhancement of the rotated light energy is determined by the specific material used for the thin film, but all magnetic materials have a critical thickness. In addition, the present invention may incorporate a dielectric layer to increase the reflectivity.

Since some magnetic materials produce very high rotation, but also high ellipticity, it is possible to design the magneto-optical transducer of the present invention so that it produces a relatively large output signal with relatively poor contrast. Other magnetic materials have a relatively low angle of rotation but a very low ellipticity. These materials would therefore produce output signals having a very high contrast. In the normal design for a magneto-optical transducer, a balance between rotation and ellipticity is usually required because of practical considerations and particular materials are chosen to produce this balance.

It is to be appreciated therefore that the particular materials used do not form a part of the present invention but rather the use of a critical thickness for the thin film is common to all magnetic materials. The foregoing description and drawings are illustrative of the invention but it is apparent that many adaptations and modifications may be made. For example, although it is desirable to use a prism because of its optical qualities and mechanical stability as a substrate for the thin film, it is not necessary to use an optical prism to practice the invention. For example, a flat substrate could be used. In addition, the prism could have other configurations than that shown in the drawings. For example, the face of the prisms on which the thin film is deposited may be curved. The invention, therefore, is not to be limited by the specific embodiments shown in the present application but is only to be limited by the appended claims.

We claim:

1. A magneto-optical transducer for use with a magnetic medium having magnetic information recorded on the medium and with polarized light directed toward the magneto-optical transducer to produce light from the magneto-optical transducer having optical characteristics in accordance with the magnetic information recorded on the magnetic medium, including a transparent substrate having characteristics of directing the polarized light through the substrate, and thin magnetic film means of a particular material disposed on one surface of the substrate and coupled to the magnetic medium to receive a magnetic induction of the magnetic information on the magnetic medium into the thin film for obtaining a rotation by the thin film of the polarized light directed toward the thin film and to obtain the production by the thin film of rotated light having optical characteristics in accordance with the magnetic information in the thin film, the thin magnetic film means being provided with a critical thickness having a value dependent upon the characteristic of the particular material to obtain the production by the thin magnetic film means of light having optimum optical characteristics for the detection of the magnetic states induced in the thin magnetic film means.

2. The magneto-optical transducer of claim 1 additionally including a layer of dielectric material disposed on the thin magnetic film in contiguous relationship to the magnetic medium to increase the reflectivity of the transducer.

3. A magneto-optical transducer for use with a magnetic medium having magnetic information recorded on the medium and with polarized light directed toward the magneto-optical transducer to produce from the magneto-optical transducer elliptically polarized light having major and minor axes and having rotations in the major axis in accordance with the magnetic information recorded on the magnetic medium, including a transparent substrate having characteristics of directing the polarized light through the substrate, and a thin magnetic film means of a particular material disposed on one surface of the substrate in magnetic proximity to the magnetic medium to obtain the magnetic induction of the magnetic information on the magnetic medium into the thin film means and to obtain the production from the thin magnetic film means of elliptically polarized light with the magnetic information in the thin film means, the thin film means being provided with a critical thickness dependent upon the characteristics of the particular material to minimize the ellipticity of the elliptically polarized light.

4. The magneto-optical transducer of claim 3 additionally including a layer of dielectric material disposed on the thin magnetic film in contiguous relationship to the magnetic medium to increase the reflectivity of the transducer.

5. A magneto-optical transducer for use with a magnetic medium having magnetic information recorded on the medium and with the magneto-optical transducer magnetically coupled to the magnetic medium to receive the magnetic information on the magnetic medium and with polarized light directed to the magneto-optical transducer to produce from the magneto-optical transducer light rotated in accordance with the magnetic information in the magneto-optical transducer, including an optical prism having properties of enhancing any rotation of the polarized light resulting from the magnetic information in the magneto-optical transducer, thin magnetic film means of a particular material disposed on the optical prism for receiving the magnetic information on the magnetic medium and for receiving the polarized light and reflecting a portion of the polarized light and passing another portion of the reflected light and rotating the light to produce light having optical characteristics in accordance with the magnetic information, the thin magnetic film means being provided with a critical thickness having a value dependent upon the characteristics of the particular material of the thin magnetic film means for maximizing the rotations in the light from the thin magnetic film means, and a layer of dielectric material disposed on the thin magnetic film means and having a critical thickness for obtaining the reflection of the light passing through the thin film means.

6. A magneto-optical transducer for use with a magnetic medium having magnetic information recorded on the medium and with the magneto-optical transducer magnetically coupled to the magnetic medium to receive the magnetic information on the magnetic medium and with polarized light directed to the magneto-optical transducer to produce from the magneto-optical transducer elliptically polarized light having major and minor axes and having rotations in the major axis in accordance with the magnetic information in the magneto-optical transducer, including an optical prism having properties of enhancing any rotation of the polarized light resulting from the magnetic information in the magneto-optical transducer, thin magnetic film means of a particular material disposed on the optical prism for receiving the magnetic information on the magnetic medium and for receiving the polarized light and passing a portion of the light and reflecting another portion of the light to produce the elliptically polarized light, the thin magnetic film means being provided with a critical thickness having a value dependent upon the characteristics of the particular material of the thin magnetic film means to reduce the ellipticity of the elliptically polarized light, and a layer of dielectric material disposed on the thin magnetic film means and having a critical thickness for obtaining a reflection of the light passing through the thin magnetic film means to maximize the magnitude of the elliptically polarized light.

7. A transducer system for use with a magnetic medium having magnetic information recorded on the medium, including a magneto-optical transducer, first means operatively coupled to the magneto-optical transducer for directing polarized light toward the magneto-optical transducer for producing light from the magneto-optical transducer having rotations in accordance with the magnetic information recorded on the magnetic medium, second means operatively coupled to the magneto-optical transducer for receiving the light from the magneto-optical transducer and for producing an output signal having characteristics in accordance with the rotations of the light, and the magneto-optical transducer including a transparent substrate having characteristics of directing the polarized light through the substrate, and a thin magnetic film of a particular material disposed on one surface of the substrate relative to the magnetic medium to have magnetic states induced in the thin film corresponding to the magnetic information on the magnetic medium and to receive the polarized light from the first means and to produce rotations of the light in accordance with the magnetic states in the thin film and to direct the rotated light to the second means, the thin film being provided with a critical thickness having a valve dependent upon the characteristics of the particular material to produce maximum rotations in the light from the thin film.

8. A transducer system for use with a magnetic medium having magnetic information recorded on the medium, including a magneto-optical transducer, first means operatively coupled to the magneto-optical transducer for directing polarized light toward the magneto-optical transducer for producing from the magneto-optical transducer elliptically polarized light having major and minor axes and having rotations in the major axis in accordance with the magnetic information recorded on the magnetic medium, second means operatively coupled to the magneto-optical transducer for receiving the elliptically polarized light from the magneto-optical transducer and for producing an output signal having characteristics in accordance with the rotations of the light, and the magneto-optical transducer, including a transparent substrate having characteristics of directing the polarized light through the substrate, and a thin magnetic film of a particular material disposed on one surface of the substrate relative to the magnetic medium to have magnetic states induced in the thin film corresponding to the magnetic information on the magnetic medium and to receive the polarized light from the first means and to rotate the light in accordance with the magnetic states in the thin film and to direct the rotated light to the second means, the thin film being provided with a critical thickness having a value dependent upon the characteristics of the particular material to reduce the ellipticity of the elliptically polarized light.

9. The magneto-optical transducer of claim 8 wherein the thin magnetic film is composed of 50 percent iron and 50 percent cobalt and has a critical thickness of approximately 200 angstroms.

10. The magneto-optical transducer of claim 8 wherein the thin magnetic film is composed of iron-cobalt and has a critical thickness of less than 300 angstroms.

11. The magneto-optical transducer of claim 8 wherein the thin magnetic film is composed of iron and has a critical thickness of less than 300 angstroms.

12. The magneto-optical transducer of claim 8 wherein the thin magnetic film is composed of germanium-iron and has a critical thickness of less than 300 angstroms.

13. The magneto-optical transducer of claim 8 wherein the thin magnetic film is composed of iron-magnesium fluoride and has a critical thickness of less than 300 angstroms.

14. A magneto-optical transducer including a substrate for supporting a thin magnetic film for use with a magnetic medium having magnetic information recorded on the medium and with polarized light directed toward the magneto-optical transducer to produce from the magneto-optical transducer light having rotations in accordance with the magnetic information recorded on the magnetic medium, including a thin magnetic film of a particular material magnetically coupled to the magnetic medium to obtain the magnetic induction of the magnetic information on the magnetic medium into the thin film for the production from the thin film, upon the direction of the polarized light toward the thin film, of light having rotations in accordance with the magnetic information in the thin film, the thin film being provided with a critical thickness having a value dependent upon the characteristics of the particular material to obtain an optimum rotation in the light from the thin film.

15. The magneto-optical transducer of claim 14 additionally including a layer of dielectric material disposed on the thin magnetic film in contiguous relationship to the magnetic medium to increase the reflectivity of the transducer to the portion of the polarized light passing through the thin film.

16. A magneto-optical transducer including a substrate for supporting a thin magnetic film for use with a magnetic medium having magnetic information recorded on the medium and with polarized light directed toward the magneto-optical transducer to produce from the magneto-optical transducer elliptically polarized light having major and minor axes and having rotations in the major axis in accordance with the magnetic information recorded on the magnetic medium, including a thin magnetic film of a particular material disposed relative to the magnetic medium to obtain the magnetic induction of the magnetic information on the magnetic medium into the thin film for the production from the thin film, upon the direction of the polarized light toward the thin film, of elliptically polarized light having rotations in the major axis in accordance with the magnetic information in the thin film, the thin film being provided with a critical thickness having a value dependent upon the characteristics of the particular material to minimize the ellipticity of the elliptically polarized light.

17. The magneto-optical transducer of claim 16 additionally including a layer of dielectric material disposed on the thin magnetic film in contiguous relationship to the magnetic medium to increase the reflectivity of the transducer to the portion of the light passing through the thin magnetic film.

18. A magneto-optical transducer for use with a magnetic medium having magnetic information recorded on the medium and with polarized light directed toward the magneto-optical transducer to produce light from the magneto-optical transducer having optical characteristics in accordance with the magnetic information recorded on the magnetic medium, including a transparent substrate, and a thin magnetic film of a particular material disposed on one surface of the substrate and coupled to the magnetic medium and with the magnetic medium magnetically inducing the magnetic information on the magnetic medium into the thin film to have magnetic information corresponding to the magnetic information on the magnetic medium and with the polarized light directed toward the thin film to obtain a rotation of the light by the thin film and to obtain the production by the thin film of rotated light having optical characteristics in accordance with the magnetic information in the thin film and with the thin film having a critical thickness in accordance with the characteristics of the particular material to obtain the production by the thin film of light having optimum optical characteristics for the detection of the magnetic states induced in the thin film, the transparent substrate being an optical prism and the prism having a first planar surface for receiving the polarized light and having a second planar surface for passing the rotated light from the substrate, the first and second planar surfaces having a particular angular relationship different from a parallel or a coplanar relationship, and the one surface of the substrate having a particular angular relationship, different from a parallel or coplanar relationship, to the first and second planar surfaces.

19. A magneto-optical transducer for use with a magnetic medium having magnetic information recorded on the medium and with polarized light directed toward the magneto-optical transducer to produce from the magneto-optical transducer elliptically polarized light having major and minor axes and having rotations in the major axis in accordance with the magnetic information recorded on the magnetic medium, including a transparent substrate, and a thin magnetic film of a particular material disposed on one surface of the substrate in magnetic proximity to the magnetic medium to obtain the magnetic induction of the magnetic information on the magnetic medium into the thin film and with the polarized light directed toward the thin film to produce from the thin film elliptically polarized light having rotations in the major axis in accordance with the magnetic information in the thin film and with the thin film having a critical thickness in accordance with the characteristics of the particular material to minimize the ellipticity of the elliptically polarized light, the transparent substrate being an optical prism and the prism having a first planar surface for receiving the polarized light and having a second planar surface for passing the rotated light from the substrate, the first and second planar surfaces having a particular angular relationship different from a parallel or a coplanar relationship, and the one surface on the substrate having a particular angular relationship, different from a parallel or coplanar relationship, to the first and second planar surfaces.

20. A transducer system for use with a magnetic medium having magnetic information recorded on the medium, including a magneto-optical transducer, first means operatively coupled to the magneto-optical transducer for directing polarized light toward the magneto-optical transducer for producing light from the magneto-optical transducer having rotations in accordance with the magnetic information recorded on the magnetic medium, second means operatively coupled to the magneto-optical transducer for receiving the light from the magneto-optical transducer and for producing an output signal having characteristics in accordance with the rotations of the light, and the magneto-optical transducer including a substrate, and a thin magnetic film of a particular material disposed on one surface of the substrate and disposed relative to the magnetic medium to have magnetic states induced in the thin film corresponding to the magnetic s information on the magnetic medium and with the thin film receiving the light from the first means and producing rotations of the light in accordance with the magnetic states in the thin film and directing the rotated light to the second means and with the thin film having a critical thickness in accordance with the characteristics of the particular material to produce maximum rotations in the light from the thin film, the substrate being an optical prism and the prism having a first planar surface for receiving the polarized light and having a second planar surface for passing the rotated light from the substrate, the first and second planar surfaces having a particular angular relationship different from a parallel or a coplanar relationship, and the one surface on the substrate having a particular angular relationship, different from a parallel or coplanar relationship, to the first and second planar surfaces.

21. A transducer system for use with a magnetic medium having magnetic information recorded on the medium, including a magneto-optical transducer, first means operatively coupled to the magneto-optical transducer for directing polarized light toward the magneto-optical transducer for producing from the magneto-optical transducer elliptically polarized light having major and minor axes and having rotations in the major axis in accordance with the magnetic information recorded on the magnetic medium, second means operatively coupled to the magneto-optical transducer for receiving the elliptically polarized light from the magneto-optical transducer and for producing an output signal having characteristics in accordance with the rotations of the light, and the magneto-optical transducer, including a substrate, and a thin magnetic film of a particular material disposed on one surface of the substrate and disposed relative to the magnetic medium to have magnetic states induced in the thin film corresponding to the magnetic information on the magnetic medium and with the thin film receiving light from the first means and rotating the light in accordance with the magnetic states in the thin film and directing the rotated light to the second means and with the thin film having a critical thickness in accordance with the characteristics of the particular material to reduce the ellipticity of the elliptically polarized light, the substrate being an optical prism and the prism having a first planar surface for receiving the polarized light and having a second planar surface for passing the rotated light from the substrate, the first and second planar surfaces having a particular angular relationship different from a parallel or a coplanar relationship, and the one surface on the substrate having a particular angular relationship, different from a parallel or coplanar relationship, to the first and second planar surfaces.

* * * * *